United States Patent
Chen

(10) Patent No.: US 12,543,112 B2
(45) Date of Patent: Feb. 3, 2026

(54) DISTRIBUTION METHOD AND DISTRIBUTION UNIT THEREOF

(71) Applicant: Wistron Corporation, New Taipei (TW)

(72) Inventor: Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 326 days.

(21) Appl. No.: 18/228,637

(22) Filed: Jul. 31, 2023

(65) Prior Publication Data

US 2024/0365225 A1 Oct. 31, 2024

(30) Foreign Application Priority Data

Apr. 26, 2023 (TW) ................................. 112115574

(51) Int. Cl.
| | |
|---|---|
| H04W 48/12 | (2009.01) |
| H04L 61/2503 | (2022.01) |
| H04L 61/2596 | (2022.01) |
| H04W 28/08 | (2023.01) |
| H04W 48/16 | (2009.01) |
| H04W 48/18 | (2009.01) |
| H04W 48/20 | (2009.01) |
| H04W 88/06 | (2009.01) |
| H04L 101/622 | (2022.01) |

(52) U.S. Cl.
CPC ......... H04W 48/20 (2013.01); H04L 61/2503 (2013.01); H04L 61/2596 (2013.01); H04W 28/08 (2013.01); H04L 2101/622 (2022.05)

(58) Field of Classification Search
CPC ... H04W 72/535; H04W 48/20; H04W 72/53; H04W 28/08; H04L 2101/622; H04L 61/103; H04L 61/2503; H04L 61/2514; H04L 61/2596
USPC ......................................................... 455/434
See application file for complete search history.

(56) References Cited

U.S. PATENT DOCUMENTS

| | | | | |
|---|---|---|---|---|
| 8,892,724 | B1 * | 11/2014 | Bertz | H04L 61/2517 709/224 |
| 2003/0041120 | A1 * | 2/2003 | Purpura | H04L 69/16 709/219 |
| 2003/0154390 | A1 * | 8/2003 | Yamauchi | H04N 21/2543 348/E7.071 |

(Continued)

FOREIGN PATENT DOCUMENTS

CN 112073503 A 12/2020

OTHER PUBLICATIONS

IP.com search history (Year: 2025).*

*Primary Examiner* — Moustapha Diaby
(74) *Attorney, Agent, or Firm* — Winston Hsu

(57) ABSTRACT

A distribution method and a distribution unit thereof are provided. The distribution unit for the distribution method is coupled to a network entity cluster. In the distribution method, a first packet is received, and a first network entity is selected from a plurality of network entities of the network entity cluster. A target MAC address of the first packet is rewritten to a MAC address of the first network entity, and the first packet to the first network entity is transmitted. With the distribution method, PDU session migration from a busy or failed network entity to an idle one can be within few seconds to avoid service disruption.

18 Claims, 6 Drawing Sheets

(56) References Cited

U.S. PATENT DOCUMENTS

| | | | |
|---|---|---|---|
| 2012/0144014 A1* | 6/2012 | Natham | H04L 67/1001 |
| | | | 709/224 |
| 2015/0326478 A1 | 11/2015 | Janakiraman | |
| 2019/0052558 A1* | 2/2019 | Mehta | H04L 45/64 |
| 2019/0357081 A1 | 11/2019 | Gottardi | |
| 2020/0169871 A1 | 5/2020 | Zhu | |
| 2020/0213233 A1* | 7/2020 | Wang | H04L 45/74 |
| 2021/0112049 A1 | 4/2021 | Yigit | |

* cited by examiner

DISTRIBUTION METHOD AND DISTRIBUTION UNIT THEREOF

BACKGROUND OF THE INVENTION

1. Field of the Invention

The present invention relates to a distribution method and a distribution unit thereof, and more particularly, to a distribution method and a distribution unit thereof capable of rapidly switching network entities.

2. Description of the Prior Art

Mobile operators prefer deploying user plane functions (UPFs) in an N:M redundancy model due to the resulting cost benefits and operational simplicity. However, N:M deployed UPFs can incur lengthy failover times (resulting in extended service disruptions). Hence, operators deploy UPFs using different redundancy models depending upon the service level agreements (SLAs) that are required by different types of services, and cannot achieve optimal cost benefits and operational simplicity. In addition, session management function (SMF) has no way of knowing the health/status of UPF(s) and switching to running UPF(s) in case of UPF failure. The existing criteria used by SMF for UPF selection cannot ensure proper load balancing. In practice, the traffic of each protocol data unit (PDU) session varies in a large range, but there is no PDU session migration to move PDU sessions from a busy/failed UPF to an idle one.

SUMMARY OF THE INVENTION

It is therefore an objective of the present invention to provide a distribution method and a distribution unit thereof to quickly switch network entities, thereby avoiding service disruption and improving availability.

An embodiment of the present invention discloses a distribution method, for a distribution unit coupled to a network entity cluster, comprising receiving a first packet; selecting a first network entity from a plurality of network entities of the network entity cluster; rewriting a target Media Access Control (MAC) address of the first packet to a MAC address of the first network entity; and transmitting the first packet to the first network entity.

An embodiment of the present invention discloses a distribution unit, coupled to a network entity cluster, comprising a processing circuit and a storage circuit. The processing circuit is configured to execute a program code. The storage circuit is coupled to the processing circuit and configured to store the program code. The program code instructs the processing circuit to perform steps of receiving a first packet; selecting a first network entity from a plurality of network entities of the network entity cluster; rewriting a target Media Access Control (MAC) address of the first packet to a MAC address of the first network entity; and transmitting the first packet to the first network entity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
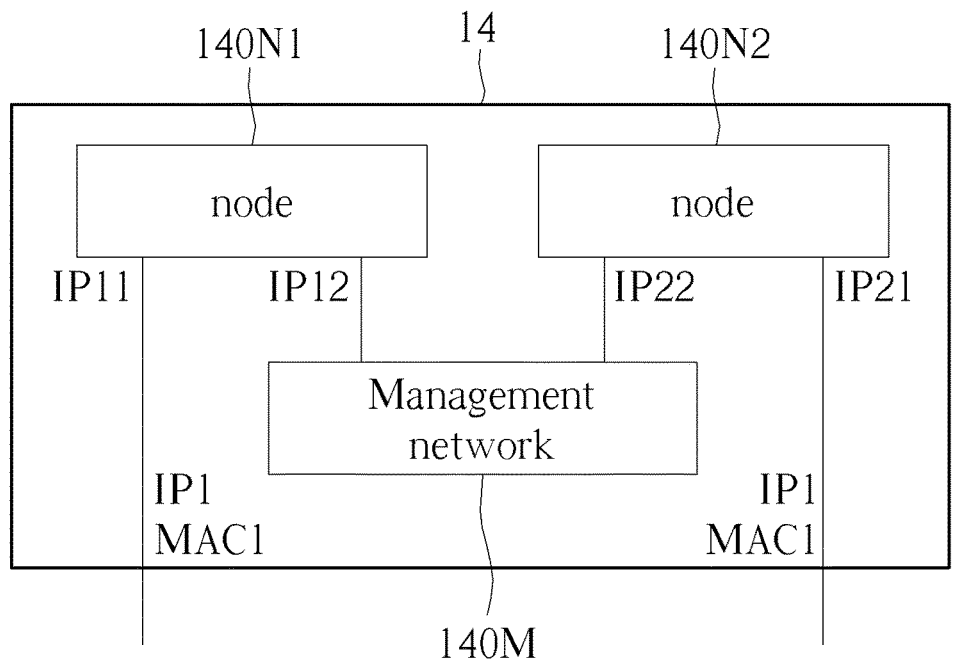
FIG. 1 is a schematic diagram of a cluster according to an embodiment of the present application.

FIG. 1 is a schematic diagram of a cluster 14 according to an embodiment of the present application. The cluster 14 may include a plurality of (cluster) nodes (e.g., 140N1, 140N2) and a management network 140M.

The external interfaces (e.g., local area network (LAN) interfaces) of all nodes (e.g., 140N1 and 140N2) are bonded to create a virtual cluster interface. All nodes may use the management network 140M to communicate, talk, control or exchange data with each other. The cluster 14 may be an active-active cluster. All nodes are capable of receiving, sending, or processing data. The management network 140M may arbitrate (e.g., according to the hash algorithm used by ClusterIP) to select one from all the nodes to receive, send or process data.

In one embodiment, the cluster 14 may have a (shared) Internet Protocol (IP) address, which may be a private IP address or a public IP address. For example, a (shared) IP address IP1 of the cluster 14 may be 192.168.10.3, and a Media Access Control (MAC) address MAC1 of the cluster 14 may be 01:02:03:04:05:06. In one embodiment, a network segment of the management network 140M may be, for example, 192.168.20.0/24. IP addresses IP11 and IP12 of the node 140N1 may be, for example, 192.168.10.1 and 192.168.20.1, respectively. IP addresses IP21 and IP22 of the node 140N2 may be, for example, 192.168.10.2 and 192.168.20.2, respectively. A network segment of a device connected to the node 140N1 or 140N2 may be, for example, 192.168.10.0/24. The nodes 140N1 and 140N2 may have different MAC addresses.

In one embodiment, the cluster 14, the node (e.g., 140N1 or 140N2), or the management network 140M may be implemented using different combinations of software, firmware, and/or hardware (e.g., circuit(s) or processor(s)). In one embodiment, ClusterIP, which may be part of the Netfilter code, may be used to implement the cluster 14 (or an active-active cluster of size m or n). In one embodiment, the management network 140M may be, for example, a switch, such as a workgroup switch. In one embodiment, the cluster 14 may be a distribution cluster (e.g., 341, 441, 541, or 641); the node (e.g., 140N1 or 140N2) may use different combinations of software, firmware, and/or hardware (e.g., load balancer(s)) to perform load distribution or load balancing. In one embodiment, the cluster 14 may be a network entity cluster (e.g., 242, 342, 442, 542 or 642); the node (e.g., 140N1 or 140N2) may be a network entity such as a user plane function (UPF), an access and mobility management function (AMF), a network repository function (NRF), a session management function (SMF), a radio unit (RU), a distributed unit (DU), or a central unit (CU).

Figure 2:
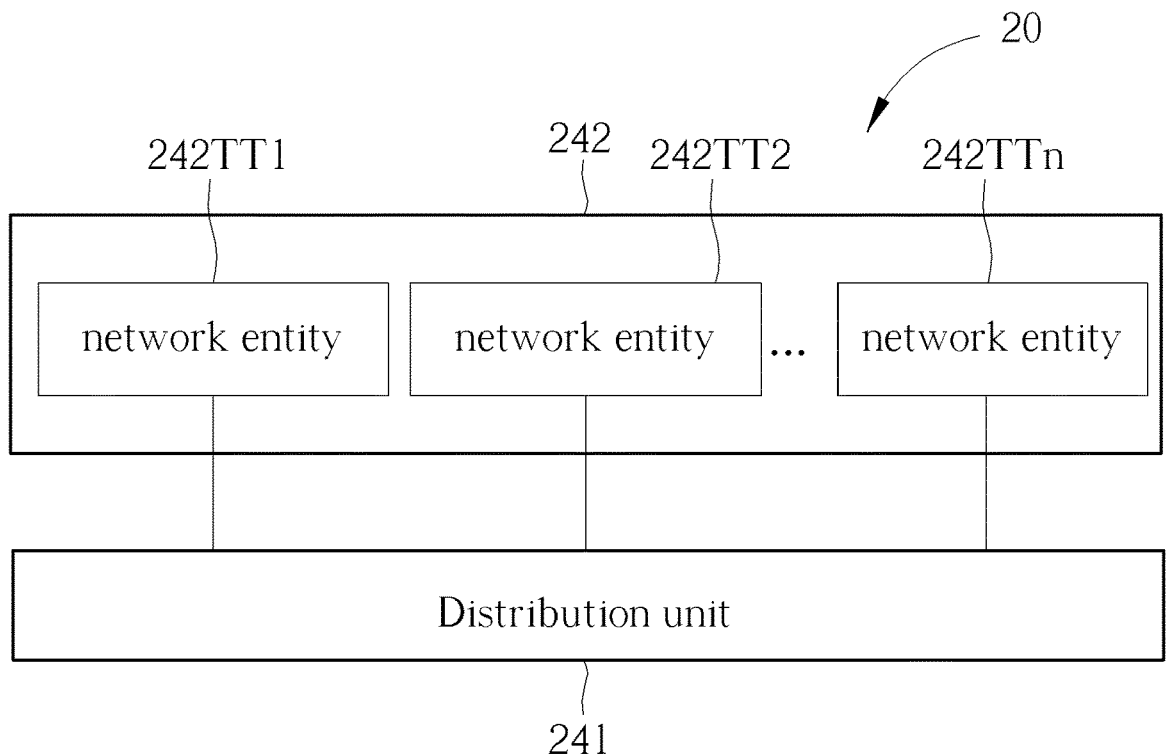
FIG. 2 is a schematic diagram of a distribution system according to an embodiment of the present application.

FIG. 2 is a schematic diagram of a distribution system 20 according to an embodiment of the present application. The distribution system 20 may include a distribution unit 241 and a network entity cluster 242. The network entity cluster 242 may include a plurality of network entities 242TT1-242TTn. The distribution unit 241 or the network entity (e.g., 242TT1 or 242TTn) may be implemented using different combinations of software, firmware, and/or hardware.

In one embodiment, the distribution unit 241 may be a distribution cluster and thus includes a plurality of nodes.

The distribution unit 241 may receive a packet and select a network entity (e.g., 242TT1) from the network entities 242TT1-242TTn. The distribution unit 241 may rewrite a target MAC address of the packet to a MAC address of the selected network entity (e.g., 242TT1) and transmit the packet to the selected network entity (e.g., 242TT1). In other words, the distribution unit 241 may perform load distribution or load balancing according to loads/states of all network entities 242TT1-242TTn and may allocate/assign/distribute tasks over one of the network entities 242TT1-242TTn. This avoids uneven overload on any particular network entity (e.g., 242TT1) while other network entities (e.g., 242TT2-242TTn) are left idle. It also ensures continuation of service provision by selecting another network entity (e.g., 242TT1) if any of the network entities 242TT1-242TTn becomes unresponsive or fails.

Figure 3:
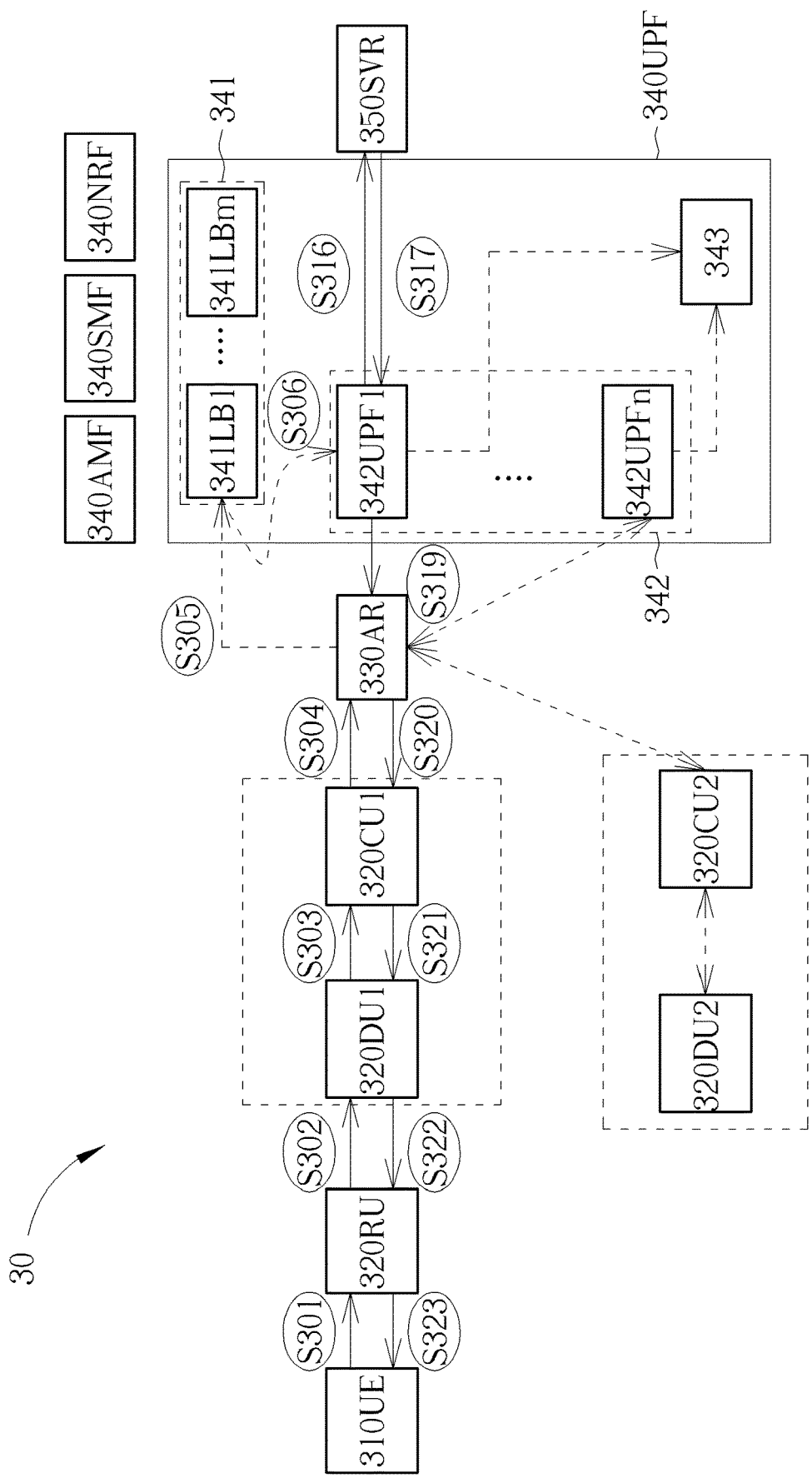
FIG. 3 to FIG. 6 are schematic diagrams of communication systems and the corresponding communication methods according to embodiments of the present application.

FIG. 3 is a schematic diagram of a communication system 30 and its communication method according to an embodiment of the present application. The communication system 30 may include a user equipment (UE) 310UE, an RU 320RU, DUs 320DU1, 320DU2, CUs 320CU1, 320CU2, a router 330AR, an AMF 340AMF, an SMF 340SMF, an NRF 340NRF, a virtual UPF 340UPF, and a server 350SVR, which may be communicatively coupled or interconnected with each other. The router 330AR (e.g., an aggregation router) is located in between the CUs 320CU1, 320CU2 and the virtual UPF 340UPF.

In FIG. 3, the virtual UPF 340UPF may include a distribution cluster 341 and a network entity cluster 342. The distribution cluster 341 may include m load balancers 341LB1-341LBm (and may be an active-active cluster of size m with a load distribution method of direct server return). The load balancers 341LB1-341LBm, which may be used as (cluster) nodes, may control, negotiate, or exchange data with one another via a management network of the distribution cluster 341 (between the cluster nodes). The load balancers 341LB1-341LBm of the distribution cluster 341 (or the distribution cluster 341) may have the same (shared) private IP address or port (e.g., port number). On startup, the distribution cluster 341 (e.g., the active-active cluster of load balancers) may register (with/using the private IP address and/or port) to the SMF 340SMF as the virtual UPF 340UPF with/having a (shared) IP address/port, which may be the private IP address/port.

The network entity cluster 342 may include n UPFs 342UPF1-342UPFn. The UPFs 342UPF1-342UPFn, which may be used as nodes, may control, negotiate, or exchange data with one another via a management network of the network entity cluster 342. The UPFs 342UPF1-342UPFn of the network entity cluster 342 may have different private IP addresses respectively, but (the network entity cluster 342 or) the UPFs 342UPF1-342UPFn have the same (shared) public IP address or port.

In FIG. 3, the UE 310UE intends to send data to the server 350SVR. After the UE 310UE registers to the SMF 340SMF through the AMF 340AMF, the SMF 340SMF may select a UPF (e.g., the virtual UPF 340UPF) from/using a local repository or the NRF 340NRF and allocate/assign the selected UPF to a protocol data unit (PDU) session of the UE 310UE. In one embodiment, a private IP address and/or port of the selected UPF (e.g., the virtual UPF 340UPF) is/are the (shared) private IP address and/or port of the distribution cluster 341 (i.e., the active-active cluster of load balancers).

As shown in steps S301-S305 in FIG. 3, a packet, which is sent by the UE 310UE and bound for the server 350SVR, passes through the RU 320RU, the DU 320DU1, the CU 320CU1, and the router 330AR (e.g., an aggregation router) and then is transmitted to the (shared) private IP address and/or port of the distribution cluster 341 (i.e., the active-active cluster of load balancers). In one embodiment, a source IP address may be a private IP address of the UE 310UE; a target IP address may be the (shared) private IP address of the distribution cluster 341.

Since the private IP addresses of the load balancers 341LB1-341LBm are the same, the management network of the distribution cluster 341 may select one (e.g., 341LB1) of the load balancers 341LB1-341LBm (e.g., as per the hash algorithm used by ClusterIP) so that the selected load balancer (e.g., 341LB1) picks up the packet. The selected load balancer (e.g., 341LB1) may rewrite a target MAC address of the packet to a MAC address of one UPF (e.g., 342UPF1) selected by the (selected) load balancer (e.g., 341LB1).

In one embodiment, state information of all PDU sessions is stored in a memory 343 (e.g., a distributed cache memory system, memcached, or Redis) so that the (selected) load balancer (e.g., 341LB1) may select one UPF (e.g., 342UPF1) in the network entity cluster 342 based on the traffic of PDU sessions on the backend UPFs 342UPF1-342UPFn. In this way, PDU session migration from a busy/failed UPF (e.g., 342UPFn) to an idle one (e.g., 342UPF1) can be within an extremely short time (e.g., 3 seconds) to avoid service disruption of the UE 310UE.

As shown in step S306 of FIG. 3, the selected load balancer (e.g., 341LB1) sends the packet to the selected UPF (e.g., 342UPF1). In one embodiment, the source IP address may be the private IP address of the UE 310UE; the target IP address may be the private IP address of the selected UPF (e.g., 342UPF1).

Later the packet is sent to the selected UPF (e.g., 342UPF1), which translates the private IP address into a public IP address based on source network address translation (SNAT). In other words, when the packet travels within the core network, it is the private IP address assigned to the UE 310UE by the SMF 340SMF that is used. When/Before the packet enters or is transmitted over the Internet, it is converted from the private IP address (of the UE 310UE) into a public IP address (for the traffic to be globally routable). In one embodiment, the public IP address is the (shared) public IP address shared by the UPFs 342UPF1-342UPFn; the private IP address is the private IP address allocated to the UE 310UE by the SMF 340SMF (for packet forwarding within the core network or providing a local routability). As shown in step S316 of FIG. 3, the selected UPF (e.g., 342UPF1) may in turn send the packet (with the public IP address and/or port and multicast MAC address) to the server 350SVR. In one embodiment, the source IP address may be the (shared) public IP address shared by the UPFs 342UPF1-342UPFn, and the target IP address may be a public IP address of the server 350SVR.

Since the source IP address of a header of the packet is the (shared) public IP address of the network entity cluster 342, in step S317 of FIG. 3, the server 350SVR may send back the (responded) packet to the network entity cluster 342 (e.g., a UPF cluster). In one embodiment, the source IP address may be the public IP address of the server 350SVR, and the target IP address may be the (shared) public IP address shared by the UPFs 342UPF1-342UPFn. That is, load distribution with direct server return may be realized.

After the network entity cluster 342 receives the (responded) packet from the server 350SVR, one UPF of the network entity cluster 342 may process the (responded)

packet. In one embodiment, the previously selected UPF (e.g., 342UPF1) may process the (responded) packet (according to instruction(s) of the management network of the network entity cluster 342). In one embodiment, if the previously selected UPF (e.g., 342UPF1) has no response or is malfunctioning, the management network of the network entity cluster 342 may arbitrate and select an (idle) UPF (e.g., 342UPFn) from the network entity cluster 342. The selected UPF (e.g., 342UPFn) may utilize relevant information stored in the memory 343 to process the (responded) packet. In this way, PDU session(s) may be migrated from a busy/failed UPF (e.g., 342UPF1) to an idle one (e.g., 342UPFn) within an extremely short time to avoid service interruption for the UE 310UE.

As shown in steps S319-S323 in FIG. 3, the selected UPF (e.g., 342UPF1) or the UPF cluster in turn may route the (responded) packet to the (original) UE 310UE. In one embodiment, the source IP address may be the private IP address of the selected UPF (e.g., 342UPF1 or 342UPFn), and the target IP address may be the private IP address of the UE 310UE.

In one embodiment, the UE 310UE may be, for example, a mobile phone; the server 450SVR may be, for example, an application (APP) server, a web server, or an IP multimedia subsystem (IMS) server. The UE 310UE may send a request to the server 450SVR, and the server 450SVR may send back a response according to the request after execution. However, the present invention is not limited thereto.

Figure 4:
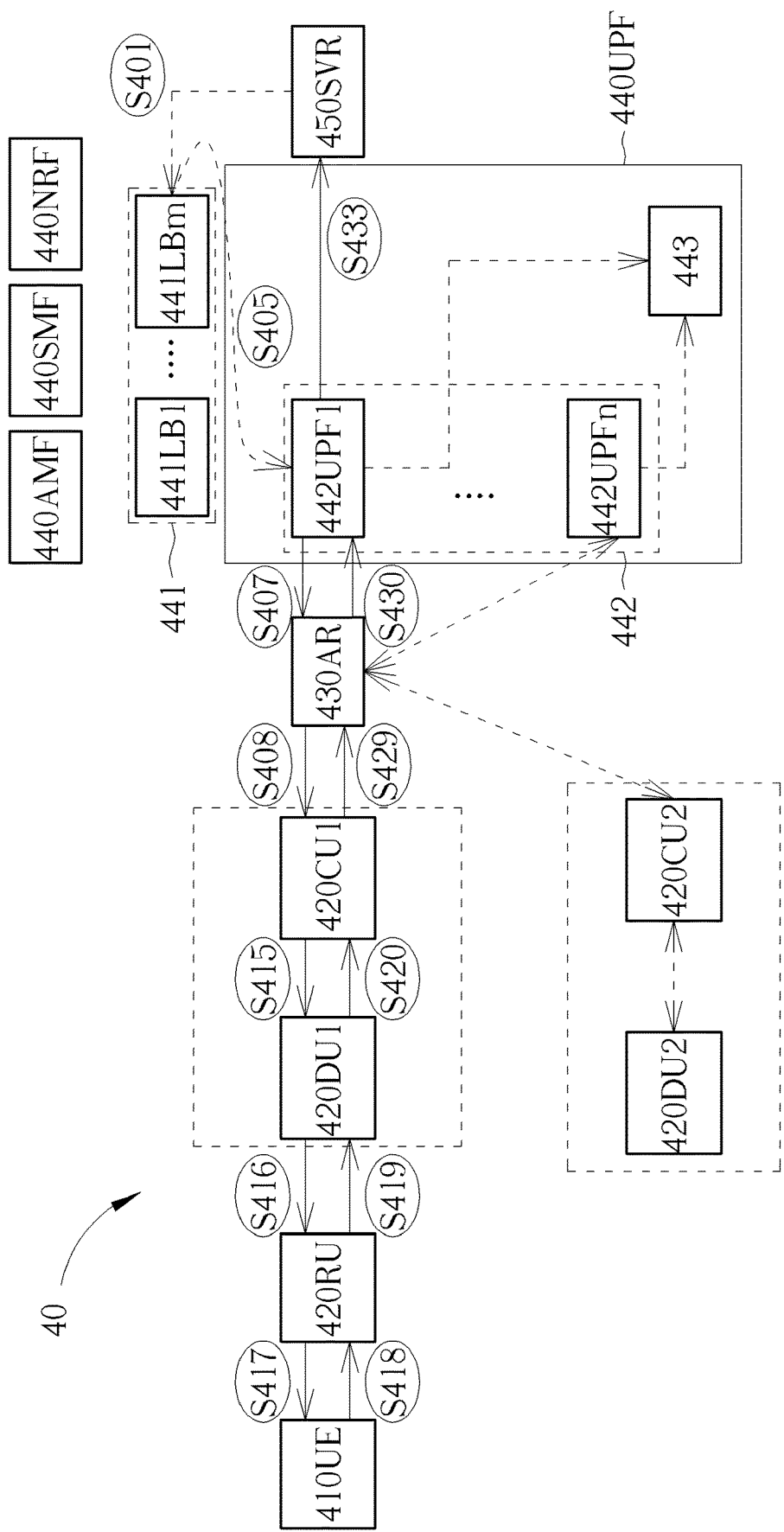

FIG. 4 is a schematic diagram of a communication system 40 and its communication method according to an embodiment of the present application. The communication system 40 may include a UE 410UE, an RU 420RU, DUs 420DU1, 420DU2, CUs 420CU1, 420CU2, a router 430AR, an AMF 440AMF, an SMF 440SMF, an NRF 440NRF, a distribution cluster 441, a network entity cluster 442, and a server 450SVR.

Figure 7:
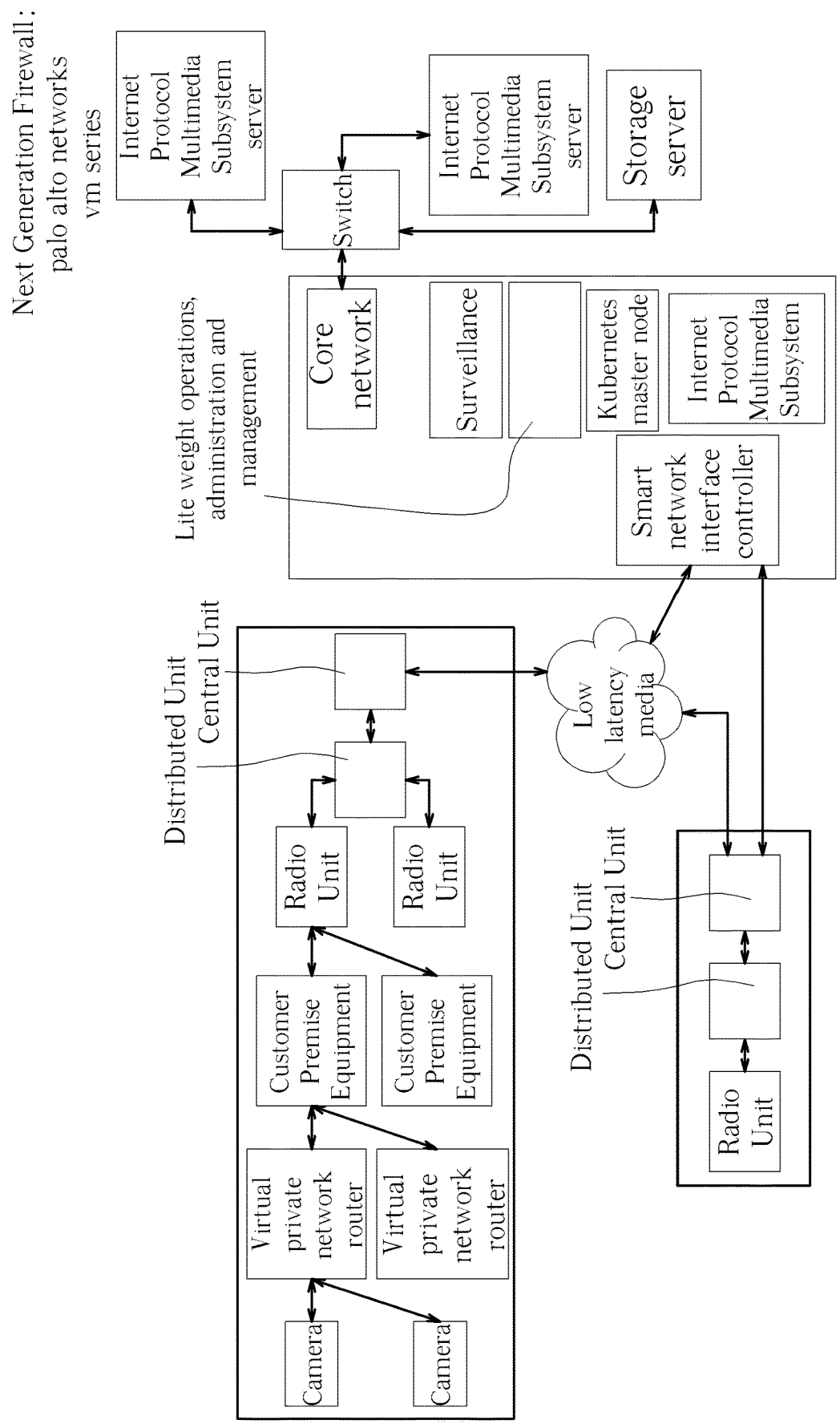
FIG. 7 is a schematic diagram of a communication system according to an embodiment of the present application.

In one embodiment (as shown in FIG. 7), the UE 410UE may be, for example, a camera; the server 450SVR may be, for example, an artificial intelligence (AI) server or an IMS server. The server 450SVR may be communicatively coupled/connected to the UE 410UE or send request(s) to the UE 410UE; the UE 410UE may respond by sending image(s) or multimedia/video/audio data to the server 450SVR. The UE 410UE and the server 450SVR may support real time streaming protocol (RTSP) streaming. However, the present invention is not limited thereto.

In FIG. 4, the distribution cluster 441 may include m load balancers 441LB1-441LBm (and may be an active-active cluster of size m with a load distribution method of direct server return). The load balancers 441LB1-441LBm, which may be used as (cluster) nodes, may control, negotiate, or exchange data with one another via a management network of the distribution cluster 441 (between the cluster nodes). The load balancers 441LB1-441LBm of the distribution cluster 441 (or the distribution cluster 441) may have the same (shared) public IP address or port.

The network entity cluster 442 may include n UPFs 442UPF1-442UPFn. The UPFs 442UPF1-442UPFn, which may be used as nodes, may control, negotiate, or exchange data with one another via a management network of the network entity cluster 442. The UPFs 442UPF1-442UPFn of the network entity cluster 442 may have different public IP addresses respectively, but (the network entity cluster 442 or) the UPFs 442UPF1-442UPFn have the same (shared) private IP address or port. On startup, the network entity cluster 442 (e.g., the active-active cluster of UPFs) may register (with/using the private IP address and/or port) to the SMF 440SMF as a virtual UPF 440UPF with/having a (shared) IP address/port, which may be the private IP address/port.

In FIG. 4, the server 450SVR intends to send data to the UE 410UE. After the UE 410UE registers to the SMF 440SMF through the AMF 440AMF, the SMF 440SMF may select a UPF (e.g., the virtual UPF 440UPF) from/using a local repository or the NRF 440NRF and allocate/assign the selected UPF to a PDU session of the UE 410UE. In one embodiment, a private IP address and/or port of the selected UPF (e.g., the virtual UPF 440UPF) is/are the (shared) private IP address and/or port of the network entity cluster 442.

As shown in step S401 of FIG. 4, a packet, which is sent by the server 450SVR and bound for the UE 410UE, is transmitted to the (shared) public IP address and/or port of the distribution cluster 441 (i.e., the active-active cluster of load balancers). In one embodiment, the packet may be sent from a public IP address of the server 450SVR to the (shared) public IP address of the distribution cluster 441.

Since the public IP addresses of the load balancers 441LB1-441LBm are the same, the management network of the distribution cluster 441 may select one (e.g., 441LB1) of the load balancers 441LB1-441LBm (e.g., as per the hash algorithm used by ClusterIP) so that the selected load balancer (e.g., 441LB1) picks up the packet. The selected load balancer (e.g., 441LB1) may rewrite a target MAC address of the packet to a MAC address of one UPF (e.g., 442UPF1) selected by the (selected) load balancer (e.g., 441LB1).

In one embodiment, state information of all PDU sessions is stored in a memory 443 so that the (selected) load balancer (e.g., 441LB1) may select one UPF (e.g., 442UPF1) in the network entity cluster 442 based on the traffic of PDU sessions on the backend UPFs 442UPF1-442UPFn. This enables the transfer of PDU session(s) from a busy/failed UPF (e.g., 442UPFn) to an idle one (e.g., 442UPF1) within an extremely short time (e.g., 3 seconds) to avoid service interruption for the UE 410UE.

As shown in step S405 in FIG. 4, after the selected load balancer (e.g., 441LB1) sends the packet to the public IP address of the selected UPF (e.g., 442UPF1), the selected UPF (e.g., 442UPF1) may convert the public IP address into a private IP address according to destination network address translation (DNAT). In one embodiment, the public IP address is the (shared) public IP address shared by the distribution cluster 441; the private IP address is a private IP address allocated to the UE 410UE by the SMF 440SMF. As shown in steps S407-S417 of FIG. 4, the selected UPF (e.g., 442UPF1) may in turn send the packet (with the private IP address and/or port and multicast MAC address) to the UE 410UE. In one embodiment, the packet may be transmitted from the (shared) private IP address shared by the network entity cluster 442 to the private IP address of the UE 410UE via the router 440AR (e.g., an aggregation router), the CU 420CU1, the DU 420DU1, and the RU 420RU.

In steps S418-S430 in FIG. 4, the UE 410UE may send back the (responded) packet to the network entity cluster 442. In one embodiment, the (responded) packet may be sent from the private IP address of the UE 410UE to the (shared) private IP address shared by the network entity cluster 442.

After the network entity cluster 442 receives the (responded) packet from the UE 410UE, one UPF of the network entity cluster 442 may process the (responded) packet. In one embodiment, the previously selected UPF (e.g., 442UPF1) may process the (responded) packet (according to instruction(s) of the management network of the network entity cluster 442). In one embodiment, if the previously selected UPF (e.g., 442UPF1) is unresponsive or fails, the management network of the network entity cluster 442 may arbitrate and select an (idle) UPF (e.g., 442UPFn) from the network entity cluster 442. The selected UPF (e.g., 442UPFn) may utilize relevant information stored in the memory 444 to process the (responded) packet. This allows for the migration of PDU session(s) from a busy/failed UPF (e.g., 442UPF1) to an idle one (e.g., 442UPFn) within an extremely short time to avoid service disruption for the UE 410UE.

As shown in step S433 in FIG. 4, the selected UPF (e.g., 442UPFn) or the UPF cluster in turn may route the (responded) packet to the (original) server 450SVR. In one embodiment, the (responded) packet may be sent from the public IP address of the selected UPF (e.g., 442UPF1) to the public IP address of the server 450SVR. That is, load distribution with direct server return may be achieved.

Figure 5:
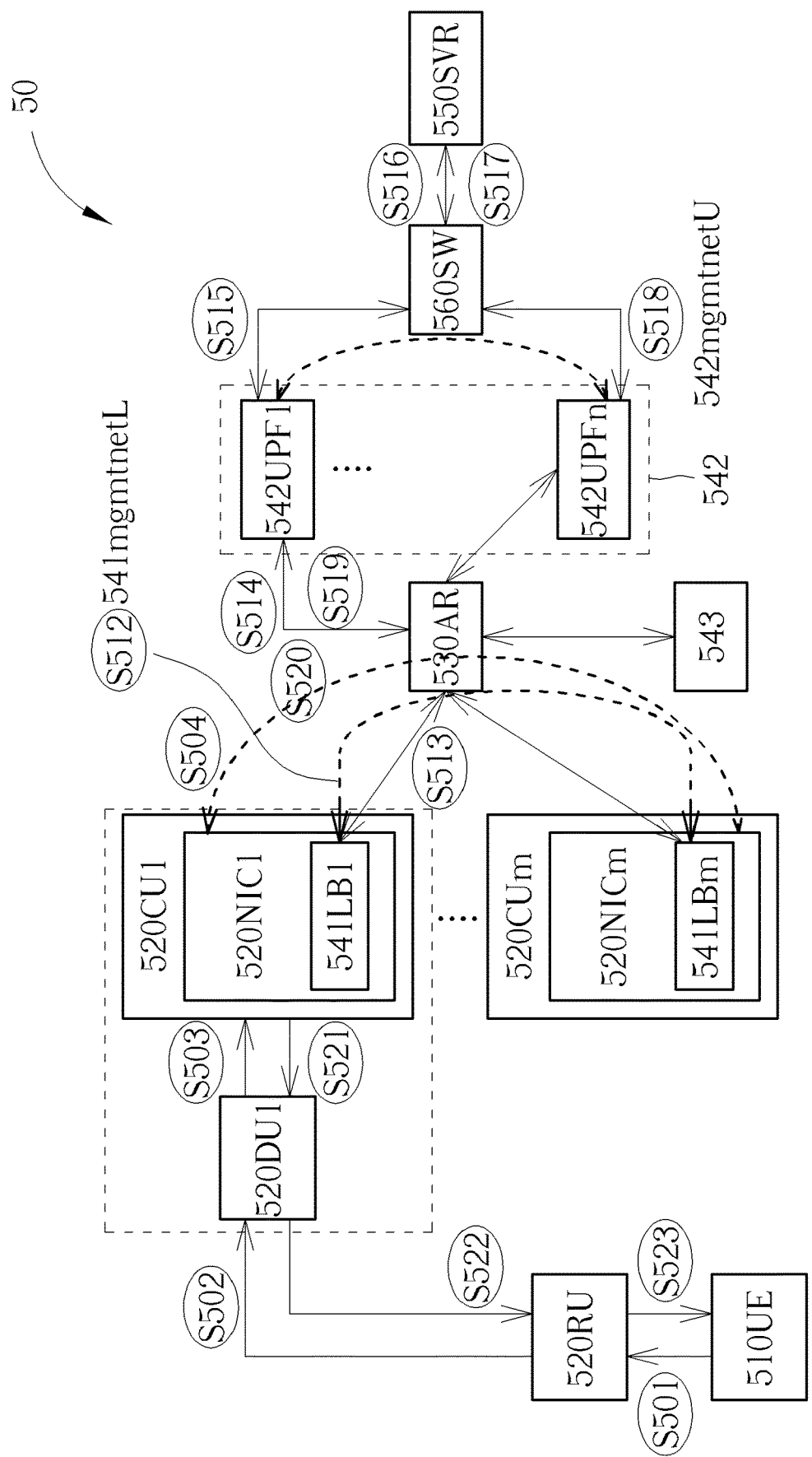

FIG. 5 is a schematic diagram of a communication system 50 and its communication method according to an embodiment of the present application. The communication system 50 may include a UE 510UE, an RU 520RU, a DU 520DU1, CUs 520CU1-520CUm, a router 530AR, a network entity cluster 542, a memory 543, and a switch 560SW (e.g., a layer 3 (L3) switch), and a server 550SVR.

In FIG. 5, the CUS 520CU1-520CUm may include network controllers 520NIC1-520NICm, respectively. The network controllers 520NIC1-520NICm, each of which may be implemented by a system-on-chip (SoC), may include load balancers 541LB1-541LBm, respectively. The load balancers 541LB1-541LBm, which may form/constitute a distribution cluster 541 and serve as nodes of the distribution cluster 541, may control, negotiate, or exchange data with one another via a management network 541mgmtnetL of the distribution cluster 541. The load balancers 541LB1-541LBm of the distribution cluster 541 (or the distribution cluster 541) may have the same (shared) private IP address or port. In other words, the load balancers 541LB1-541LBm may be realized/implemented by leveraging computing resources of the CUS 520CU1-520CUm.

In FIG. 5, the network entity cluster 542 may include n UPFs 542UPF1-542UPFn. The UPFs 542UPF1-542UPFn, which may be used as nodes, may control, negotiate, or exchange data with one another via a management network 542mgmtnetU of the network entity cluster 542. The UPFs 542UPF1-542UPFn of the network entity cluster 542 may have different private IP addresses respectively, but (the network entity cluster 542 or) the UPFs 542UPF1-542UPFn have the same (shared) public IP address or port.

As shown in steps S501-S504 and S512 in FIG. 5, a packet, which is sent by the UE 510UE and bound for the server 550SVR, is transmitted to the distribution cluster 541. As shown in step S512 of FIG. 5, since the private IP addresses shared by the load balancers 541LB1-541LBm are the same, the management network 541mgmtnetL of the distribution cluster 541 may select one (e.g., 541LB1) of the load balancers 541LB1-541LBm to pick up the packet. The select load balancer (e.g., 541LB1) may rewrite a target MAC address of the packet to a MAC address of one UPF (e.g., 542UPF1) selected by the load balancer (e.g., 541LB1). In one embodiment, state information of all PDU sessions is stored in the memory 543 so that the (selected) load balancer (e.g., 541LB1) may select one UPF (e.g., 542UPF1) in the network entity cluster 542 based on the traffic of PDU sessions on the backend UPFs 542UPF1-542UPFn.

As shown in steps S513-S514 in FIG. 5, after the selected load balancer (e.g., 541LB1) sends the packet to the private IP address of the selected UPF (e.g., 542UPF1), the selected UPF (e.g., 542UPF1) may convert the private IP addresses to a public IP addresses based on source network address translation. In one embodiment, the public IP address is the (shared) public IP address shared by the UPFs 542UPF1-542UPFn. As shown in steps S515-S516 of FIG. 5, the selected UPF (e.g., 542UPF1) may send the packet (with the public IP address and/or port and multicast MAC address) to the server 550SVR.

Since the source IP address of a header of the packet is the (shared) public IP address of the network entity cluster 542, in steps S517-S518 in FIG. 5, the server 550SVR may send back the (responded) packet to the network entity cluster 542. That is, load distribution with direct server return may be achieved. In one embodiment, in step S518 of FIG. 5, the previously selected UPF (e.g., 542UPF1) may process the (responded) packet (according to instruction(s) of the management network 542mgmtnetU of the network entity cluster 542). In one embodiment, in step S518 of FIG. 5, if the previously selected UPF (e.g., 542UPF1) does not respond or fails, the management network 542mgmtnetU of the network entity cluster 542 may arbitrate and select an (idle) UPF (e.g., 542UPFn) from the network entity cluster 542. The selected UPF (e.g., 542UPFn) may utilize relevant information stored in the memory 543 to process the (responded) packet.

As shown in steps S519-S523 in FIG. 5, the selected UPF (e.g., 542UPFn) or the UPF cluster in turn may route the (responded) packet to the (original) UE 510UE.

Figure 6:
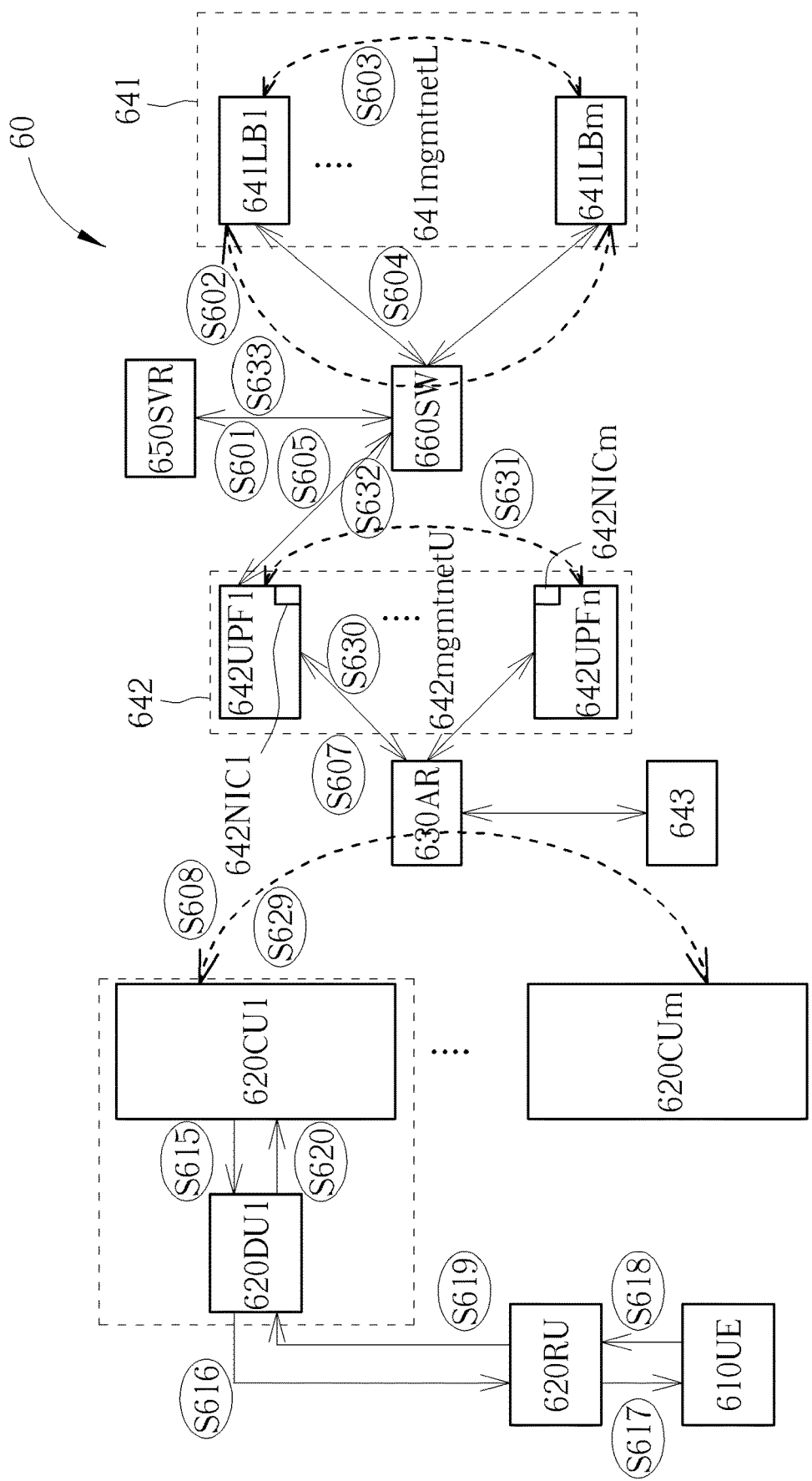

FIG. 6 is a schematic diagram of a communication system 60 and its communication method according to an embodiment of the present application. The communication system 60 may include a UE 610UE, an RU 620RU, a DU 620DU1, CUs 620CU1-620CUm, a router 630AR, a distribution cluster 641, a network entity cluster 642, a memory 643, a switch 660SW (e.g., an L3 switch), and a server 650SVR. In other words, the distribution cluster 641 (e.g., a load balancer cluster) is added between the network entity cluster 642 (e.g., a UPF cluster) and the server 650SVR.

The distribution cluster 641 may include m load balancers 641LB1-641LBm. The load balancers 641LB1-641LBm, which may be used as nodes, may control, negotiate, or exchange data with one another via a management network 641mgmtnetL of the distribution cluster 641. The load balancers 641LB1-641LBm of the distribution cluster 641 (or the distribution cluster 641) may have the same (shared) public IP address or port.

The network entity cluster 642 may include n UPFs 642UPF1-642UPFn. The UPFs 642UPF1-642UPFn, which may be used as nodes, may control, negotiate, or exchange data with one another via a management network 642mgmtnetU of the network entity cluster 642. The UPFs 642UPF1-642UPFn of the network entity cluster 642 may have different public IP addresses respectively, but (the network entity cluster 642 or) the UPFs 642UPF1-642UPFn have the same (shared) private IP address or port.

In one embodiment, the UPFs 642UPF1-642UPFn may include computing circuits 642NIC1-642NICm, each of which may be implemented by a SoC, respectively. The computing circuits 642NIC1-642NICm may include load balancers 641LB1-641LBm respectively. In other words, the load balancers 641LB1-641LBm may be realized/implemented by leveraging computing resources of the UPFs 642UPF1-642UPFn. However, the load balancers 641LB1-

641LBm may also be independently configured/disposed outside the UPFs 642UPF1-642UPFn as shown in FIG. 6.

As shown in steps S601-S602 in FIG. 6, the packet, which is sent by the server 650SVR and bound for the UE 610UE, is transmitted to the distribution cluster 641. As shown in step S603 in FIG. 6, since the (shared) public IP addresses shared by the load balancers 641LB1-641LBm are the same, the management network 641mgmtnetL of the distribution cluster 641 may select one (e.g., 641LB1) of the load balancers 641LB1-641LBm to pick up the packet. The selected load balancer (e.g., 641LB1) may rewrite a target MAC address of the packet to a MAC address of one UPF (e.g., 642UPF1) selected by the load balancer (e.g., 641LB1). In one embodiment, state information of all PDU sessions is stored in the memory 643 so that the (selected) load balancer (e.g., 641LB1) may select one UPF (e.g., 642UPF1) in the network entity cluster 642 based on the traffic of PDU sessions on the backend UPFs 642UPF1-642UPFn.

As shown in steps S604-S605 in FIG. 6, after the selected load balancer (e.g., 641LB1) sends the packet to the public IP address of the selected UPF (e.g., 642UPF1), the selected UPF (e.g., 642UPF1) may translate the public IP address into a private IP address according to the destination network address translation. As shown in steps S607-S617 of FIG. 6, the selected UPF (e.g., 642UPF1) may in turn send the packet (with the private IP address and/or port and multicast MAC address) to the UE 610UE.

In steps S618-S630 in FIG. 6, the UE 610UE may send back the (responded) packet to the network entity cluster 642. In one embodiment, in step S631 of FIG. 6, the previously selected UPF (e.g., 642UPF1) may process the (responded) packet (according to instruction(s) of the management network 642mgmtnetU of the network entity cluster 642). In one embodiment, in step S631 of FIG. 6, if the previously selected UPF (e.g., 642UPF1) becomes unresponsive or malfunctions, the management network 642mgmtnetU of the network entity cluster 642 may arbitrate and select an (idle) UPF (e.g., 642UPFn) from the network entity cluster 642. The selected UPF (e.g., 642UPFn) may utilize relevant information stored in the memory 643 to process the (responded) packet.

As shown in steps S632-S633 in FIG. 6, the selected UPF (e.g., 642UPFn) in turn may route the (responded) packet to the (original) server 650SVR. That is, load distribution with direct server return may be achieved.

In one embodiment, the steps S501-S504, S516, S517, and S519-S523 roughly correspond to the steps S301-S304, S316, S317, and S319-S323. The steps S601, S605, S607, S608, S615-S620, S629-S630, and S633 roughly correspond to the steps S401, S405, S407, S408, S415-S420, S429-S430, and S433.

In summary, when a PDU session is to be transmitted to a network entity (e.g., a UPF), the invention allows for rapid switching between a busy/malfunctioning network entity and an idle one using the distribution unit (or the management network of the network entity cluster), which enables the transmission of PDU to the idle network entity to avoid service disruption and improve availability. The invention achieves the same end user experience during a network entity (e.g., UPF) failure as seen with a 1:1 redundancy model but with lower capital expenditure. Moreover, basically every network entity (e.g., UPF) is used without being idle, while even for N:M redundancy model it still has M/(N+M) network entities (e.g., UPFs) idle. In addition, the load balancing of network entities (e.g., UPFs) is enhanced so that scale-out of network entities (e.g., UPFs) and thus (high) throughput of core network are possible. Furthermore, a packet is forwarded through the distribution unit, but another packet that responds to this packet does not pass through the distribution unit, thereby allowing for direct server return.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A distribution method, for a distribution unit coupled to a network entity cluster, comprising:
   receiving a first packet;
   selecting a first network entity from a plurality of network entities of the network entity cluster;
   rewriting a target Media Access Control (MAC) address of the first packet to a MAC address of the first network entity; and
   transmitting the first packet to the first network entity;
   wherein the first network entity is selected by the distribution unit from the plurality of network entities of the network entity cluster to transmit the first packet, which is sent from a first entity to the distribution unit, to a second entity via the first network entity, a second network entity from the plurality of network entities is selected by a management network of the network entity cluster to receive a second packet from the second entity and transmit the second packet to the first entity, and the first network entity and the second network entity are a same network entity or different network entities.

2. The distribution method of claim 1, wherein the distribution unit is configured to select the first network entity according to traffic of the plurality of network entities.

3. The distribution method of claim 1, wherein the distribution unit is a cluster and comprises a plurality of nodes, a first node of the plurality of nodes is selected from the plurality of nodes according to a hash algorithm to rewrite a target MAC address, and each of the plurality of nodes is a load balancer.

4. The distribution method of claim 1, wherein the distribution unit or the network entity cluster registers with a session management function as a virtual user plane function with a private Internet Protocol (IP) address, the private IP address is shared by a plurality of nodes of the distribution unit or shared by the plurality of network entities of the network entity cluster.

5. The distribution method of claim 1,
   wherein a plurality of nodes of the distribution unit have a shared private IP address, and the plurality of network entities of the network entity cluster have a shared public IP address; or
   wherein the plurality of nodes of the distribution unit have a shared public IP address, and the plurality of network entities of the network entity cluster have a shared private IP address.

6. The distribution method of claim 1, wherein the distribution unit or the network entity cluster comprises the management network, and one node is selected by the management network from a plurality of nodes of the distribution unit according to a hash algorithm or one network entity is selected by the management network from the plurality of network entities of the network entity cluster according to traffic or status of the plurality of network entities.

7. The distribution method of claim 1, wherein the first network entity is configured to convert a private IP address into a shared public IP address of the network entity cluster or configured to convert a shared public IP address of the distribution unit into a private IP address.

8. The distribution method of claim 1, wherein each of the plurality of network entities is a user plane function, a radio unit, a distribution unit, or a central unit.

9. The distribution method of claim 1,
wherein a plurality of nodes of the distribution unit are disposed within a plurality of user plane functions, a plurality of radio units, a plurality of distributed units, or a plurality of central units, respectively; or
wherein the distribution unit is independently disposed outside the plurality of user plane functions, the plurality of radio units, the plurality of distributed units, or the plurality of central units.

10. A distribution unit, coupled to a network entity cluster, comprising:
a processing circuit, configured to execute a program code; and
a storage circuit, coupled to the processing circuit and configured to store the program code, wherein the program code instructs the processing circuit to perform following steps:
receiving a first packet;
selecting a first network entity from a plurality of network entities of the network entity cluster;
rewriting a target Media Access Control (MAC) address of the first packet to a MAC address of the first network entity; and
transmitting the first packet to the first network entity;
wherein the distribution unit is configured to select the first network entity from the plurality of network entities of the network entity cluster to transmit the first packet, which is sent from a first entity to the distribution unit, to a second entity via the first network entity, a management network of the network entity cluster is configured to select a second network entity from the plurality of network entities to receive a second packet from the second entity and transmit the second packet to the first entity, and the first network entity and the second network entity are a same network entity or different network entities.

11. The distribution unit of claim 10, wherein the distribution unit is configured to select the first network entity according to traffic of the plurality of network entities.

12. The distribution unit of claim 10, wherein the distribution unit is a cluster and comprises a plurality of nodes, a first node of the plurality of nodes is selected from the plurality of nodes according to a hash algorithm to rewrite a target MAC address, and each of the plurality of nodes is a load balancer.

13. The distribution unit of claim 10, wherein the distribution unit or the network entity cluster registers with a session management function as a virtual user plane function with a private Internet Protocol (IP) address, the private IP address is shared by a plurality of nodes of the distribution unit or shared by the plurality of network entities of the network entity cluster.

14. The distribution unit of claim 10,
wherein a plurality of nodes of the distribution unit have a shared private IP address, and the plurality of network entities of the network entity cluster have a shared public IP address; or
wherein the plurality of nodes of the distribution unit have a shared public IP address, and the plurality of network entities of the network entity cluster have a shared private IP address.

15. The distribution unit of claim 10, wherein the distribution unit or the network entity cluster comprises the management network, and the management network is configured to select one node from a plurality of nodes of the distribution unit according to a hash algorithm or configured to select one network entity from the plurality of network entities of the network entity cluster according to traffic or status of the plurality of network entities.

16. The distribution unit of claim 10, wherein the first network entity is configured to convert a private IP address into a shared public IP address of the network entity cluster or configured to convert a shared public IP address of the distribution unit into a private IP address.

17. The distribution unit of claim 10, wherein each of the plurality of network entities is a user plane function, a radio unit, a distribution unit, or a central unit.

18. The distribution unit of claim 10,
wherein a plurality of nodes of the distribution unit are disposed within a plurality of user plane functions, a plurality of radio units, a plurality of distributed units, or a plurality of central units, respectively; or
wherein the distribution unit is independently disposed outside the plurality of user plane functions, the plurality of radio units, the plurality of distributed units, or the plurality of central units.

* * * * *